United States Patent [19]
Zane et al.

[11] 3,907,184
[45] Sept. 23, 1975

[54] ROOF-TOP CONTAINER

[76] Inventors: James E. Zane, 13879 Kimberly Dr., Largo, Fla. 33540; John B. Foster, 225 Greenmeadow, Palo Alto, Calif. 94306

[22] Filed: Dec. 19, 1973

[21] Appl. No.: 425,993

[52] U.S. Cl. .................................. 224; 224/42.1 E
[51] Int. Cl. .............................................. B60m 9/04
[58] Field of Search...... 224/42.1 E, 42.1 F, 42.1 D, 224/42.1 R, 29 R; 220/31 S, 31 R

[56] References Cited
UNITED STATES PATENTS

| | | | |
|---|---|---|---|
| 2,597,656 | 5/1952 | Martin | 224/42.1 E |
| 3,095,129 | 6/1963 | Kerr | 224/42.1 E |
| 3,145,889 | 8/1964 | Altman et al. | 224/42.1 B |
| 3,212,125 | 10/1965 | Hussell | 220/31 S |

*Primary Examiner*—Robert J. Spar
*Assistant Examiner*—Jerold M. Forsberg
*Attorney, Agent, or Firm*—Stein & Orman

[57] ABSTRACT

A luggage container device designed to be attached to the roof of a passenger automobile or like vehicle, comprising support means, including attachment means, attached to the vehicle roof and cover means correspondingly figured to the support means and removably attachable to the support means, whereby luggage may be placed on the support means and enclosed by the cover means, thereby protecting the luggage from both weather and theft.

10 Claims, 8 Drawing Figures

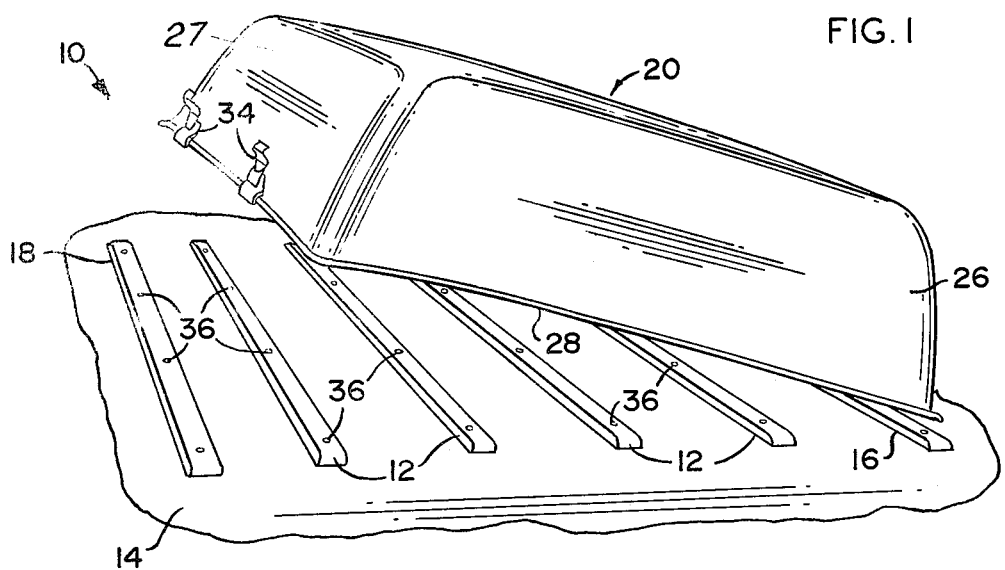
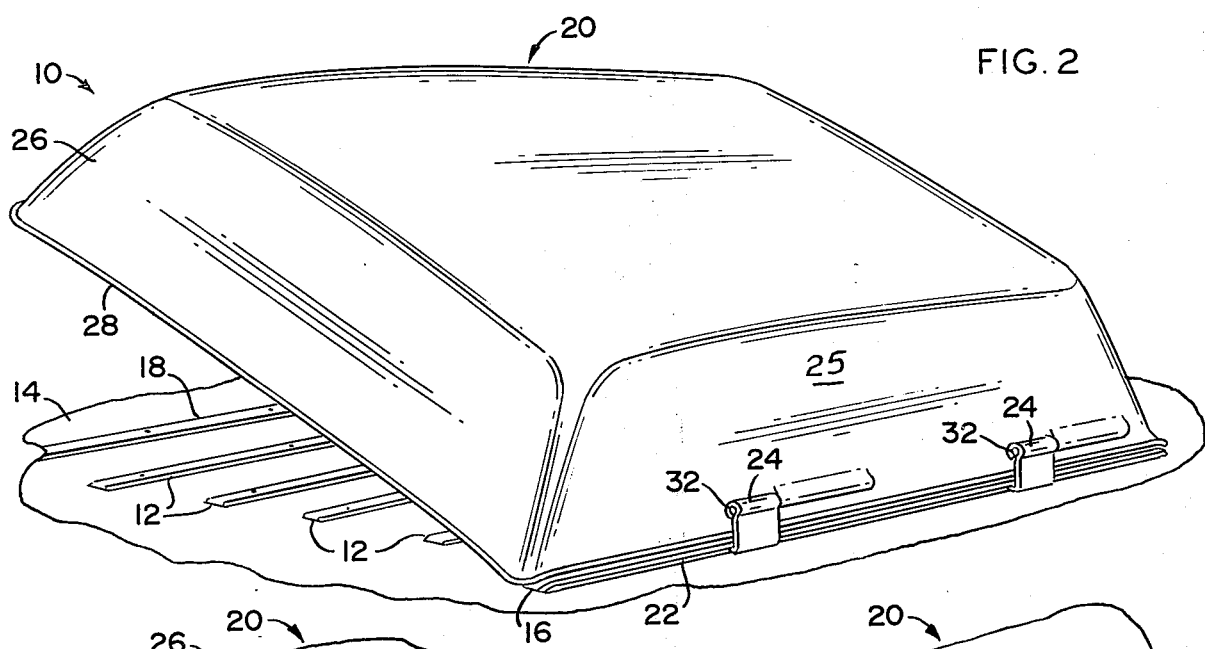
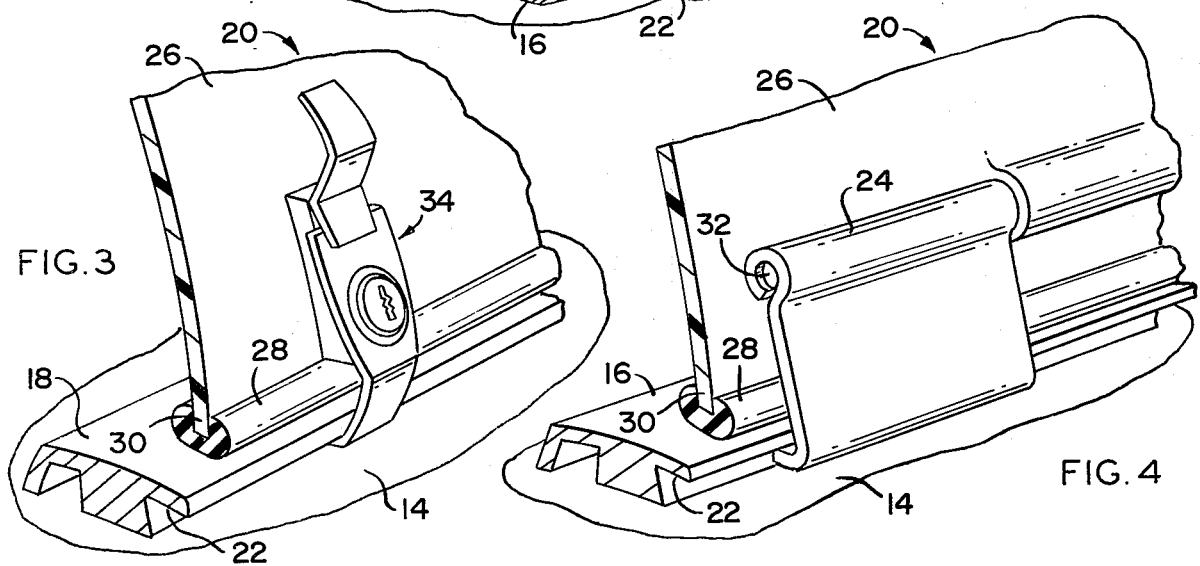

ROOF-TOP CONTAINER

BACKGROUND OF THE INVENTION

1. Field of the Invention

This invention relates to a roof-top luggage container device comprising support means and cover means wherein the support means and cover means are correspondingly configured so that the cover means may be removably attached to the support means.

2. Description of the Prior Art

Various types of luggage or rack devices are well-known in the prior art. Such devices are perhaps best known today for use on station wagon, van type campers and other recreational vehicles. Prior art devices generally comprise rub-rails, stanchions and side rails. However, noticeably absent from such prior art devices is an integrally designed cover means, whereby articles placed on the luggage rack can be enclosed and protected from both weather and theft.

Admittedly, the idea of covering or enclosing luggage racks is known in the prior art. Indeed, it is well recognized in the trade that it would be desirable to protect articles carried on luggage racks from exposure to both weather and theft. However, suitable means for efficiently obtaining these goals are heretofore unknown.

One means of protecting items carried on luggage racks has been the use of tarpaulin secured around the goods being carried. However, the use of a tarpaulin has not proved satisfactory, for not only is the tarpaulin difficult to handle, but if it is not properly secured, it is easily blown away. While the tarpaulin does provide some protection from the weather, it affords virtually no protection against theft.

One prior art device, U.S. Pat. No 3,145,889, does appear to disclose a luggage carrier affording protection from both weather and theft. However, the device disclosed thereby is not permanently attached to the roof of the automobile. Rather, the deviced disclosed by that patent comprises a flat platform and a hollow shell or cover hinged thereto. The platform further includes a plurality of legs designed to engage the roof gutters of the automobile top. Such a device is obviously intended as an accessory for an automobile, and by no means could be considered an effective means of solving related problems as set forth above.

Other known devices of the type disclosed in U.S. Pat. No. 3,223,301, relates to a car-top carrier which utilizes a novel stanchion angularly adjustable relative to the base. This structure permits use of the stanchion on the tops of vehicles having different configurations or dimensioned variations. Two other prior art devices as shown respectively in U.S. Pat. Nos. 3,330,450 and 3,719,313, relate to vehicle top carriers constructed to fit vehicle roofs of various shapes, sizes and contours.

While the prior art structures presently available, as represented by the structures of the above cited patents, are specifically designed to accomplish certain goals, the majority of these structures do not effectively solve certain other problems existing in the industry as set forth above.

Accordingly, it is obvious that there is a need in the automotive industry for a luggage container device of a generally simple, efficient design capable of being manufactured and installed at a reasonable price and capable of providing protection of the goods placed therein from weather and theft, while maintaining an attractive external appearance.

SUMMARY OF THE INVENTION

This invention relates to a roof-top luggage container device of the type designed to be mounted on the top of an automobile or like vehicle and including both support means and cover means. More specifically, the support means comprises a plurality of substantially parallel rub rails disposed in spaced relation to each other and permanently attached to the top of the automobile. The two outermost rub rails further include attachment means whereby the cover may be removably attached in abutting relation to the two rub rails and to the automobile top. In the preferred embodiment of the present invention, the attachment means comprises a lip formed on the outside of each of the two outermost rub rails. The attachment means further comprises a plurality of hinges formed on one of the outermost rub rails and disposed in predetermined relation to one another. Preferably, these hinges are formed on that rub rail extending along the driver's side of the automobile for reasons that will be discussed in more detail hereinafter.

The cover means comprises a body formed from fiberglass or similar material. A sealing gasket is mounted on a peripheral edge of the body in abutting relation to the two rub rails and to the automobile top, when the cover is placed in operative position. The means further comprises a plurality of pins attached to one side of the body in corresponding relation to the hinges formed on the rub rail. It should be noted that the pins extend in the same relative direction, thereby facilitating engagement of the cover to the support means. The cover means further comprises a plurality of lock means attached to the opposite side of the body in engaging relationship to the lip formed on the corresponding rub rail.

As stated above, the hinges are preferably formed on the rub rail running along the driver's side of the automobile; therefore, the pins of the cover are necessarily formed on the side of the cover body. It therefore follows that the lock means are attached on the passenger's side of the cover body and engage the rub rails formed along that side of the automobile. The purpose of this arrangement of the hinges and locks is to provide safe access to the materials stored in the luggage carrier when the vehicle is parked, without standing in the lane of traffic.

It should also be noted that in the structure of the preferred embodiment the forward and after ends of the cover body extend slightly below the plane formed by the peripheral edge of the body sides. By virtue of this construction, when placed in operative position, the cover body abuts the two rub rails on each side and the vehicle top at the front and back. It should be apparent that the combined action of the hinges, lock, and resilient gasket with the support means provides both a weather proof and theft proof seal.

In another embodiment of the present invention, the attachment means comprises, rather than the lip of the preferred embodiment a plurality of hinges formed on one of the two rub rails and a plurality of brackets formed on the other of the two rub rails. The cover means of this second embodiment comprises a plurality of lock means attached to one side of the cover body in engaging relationship to the brackets and a plurality of pins attached to the other side of the cover body in corresponding relation to the hinges formed on the one rub rail.

Other embodiments of the present invention comprise the support means including a plurality of stanchions attached to the automobile top in mating relation to the end of the rub rails, a plurality of cross rails attached to the automobile top in transverse relation to the rub rails, each in mating relation to two of the stanchions and a plurality of upper support rails matingly attached to the top of the stanchions, each of the upper support rails extending between two of the stanchions. The cover means of the embodiments described is configured to completely enclose the support means and to be removably attached and secured in abutting relation to the support means. Consequently, the peripheral edge of that cover means defines a single plane.

This invention accordingly comprises an article of manufacture possessing the features, properties and the relation of elements which will be exemplified in the article hereinafter described, and the scope of the invention will be indicated in the claims.

BRIEF DESCRIPTION OF THE DRAWINGS

For a fuller understanding of the nature and objects of the invention, reference should be had to the following detailed description taken in connection with the accompanying drawings in which:

FIG. 1 is a front perspective view of the device of the present invention.

FIG. 2 is a perspective view of one side of the device.

FIG. 3 is a detail view of the lock means attached to the device.

FIG. 4 is a detail view of the hinges of the device.

Similar reference characters refer to similar parts throughout the several views of the drawings.

DETAILED DESCRIPTION

Figure 6:
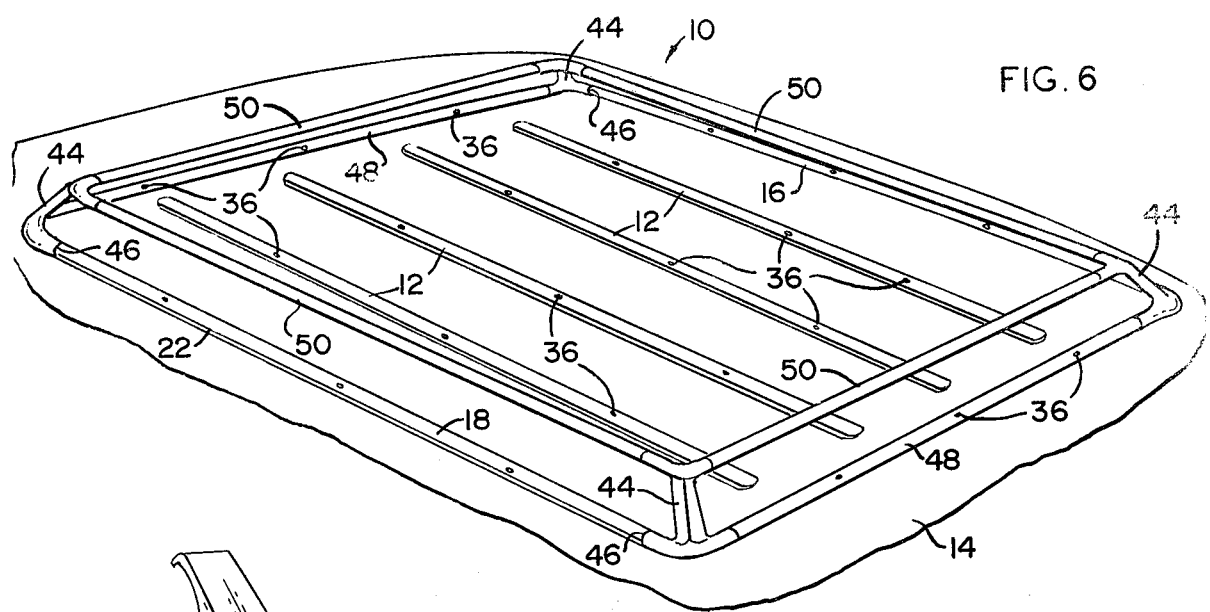
FIG. 6 is a perspective view of another embodiment of the device of the present invention.

This invention relates to a roof-top luggage container device generally indicated as 10 in FIG. 1, of the type designed to be mounted on the top of a passenger automobile or like vehicle and including both support means and cover means. The support means comprise a plurality of substantially parallel rub rails 12 disposed in substantially parallel, spaced relation to each other and which may be permanently attached to the top 14 of an automobile. The two outermost rub rails 16 and 18, further include attachment means whereby cover 20 may be removably attached in abutting relation to rub rails 16 and 18, and to vehicle top 14.

In the preferred embodiment of the present invention, the attachment means comprises a lip 22 formed along the outer longitudinal edge of each of the two outermost rub rails 16 and 18. The attachment means further comprises hinge means including a plurality of hinges 24 formed on outermost rub rail 16 and disposed in predetermined relation to one another. Preferably, outermost rub rail 16 extends along the driver's side of top 14. This disposition allows safe access to the materials stored in device 10 when the vehicle is parked by eliminating the necessity of standing in the lane of moving traffic.

Figure 5:
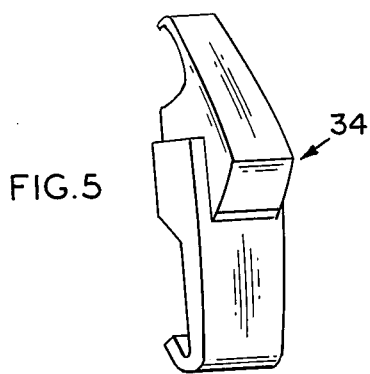
FIG. 5 is a detail view of an alternate lock means.

Cover 20 of the preferred embodiment comprises a body 26 formed from a substantially rigid material such as fiberglass or other applicable material. The body comprises oppositely disposed side walls 25 and 27 (FIGS. 1 and 2). As best seen in FIGS. 2 and 4, a sealing gasket 28 is mounted on a peripheral edge 30 of body 26 in abutting relation to outermost rub rails 16 and 18 and to top 14. Cover 20 further comprises a plurality of pins 32, best seen in FIGS. 2 and 4, attached to one side of body 26 in corresponding relation to hinges 24 formed on rub rail 16. Pins 32 are fixedly attached to body 26 and have exposed portions extending in the same relative direction, thereby facilitating engagement of body 26 to hinges 24. Cover 20 further comprises a plurality of lock means 34 fixedly attached to another side of body 26 substantially opposite pins 32. Lock means 34 are attached to body 26 in engaging relationship to lip 22 formed on rub rail 18. As shown in FIG. 3, lock means 34 may be any conventional clip-type lock well known in the art. An alternate form of lock means 34 is shown in FIG. 5.

It should be noted that rub rails 12, 16 and 18 may be attached to automobile 14 by means of any conventional fastener 36, such as screws, bolts, or rivets. In order to provide maximum security to goods placed within device 10, fasteners 36 are disposed along rub rails 12, 16 and 18 so as to be enclosed when cover 20 is attached. By virtue of this construction, body 26 abuts rub rails 16 and 18 on each side and automobile top 14 at the front and back. It should be apparent that the combined action of hinges 24, lock means 34 and gasket 28 provides both a weather proof and theft proof seal.

Figure 7:
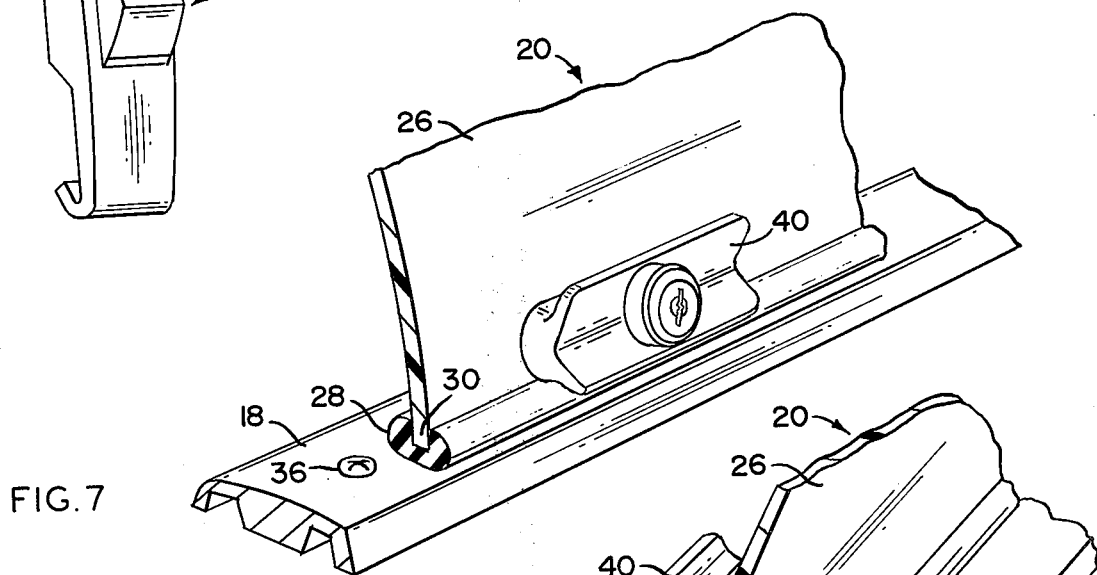
FIG. 7 is a detail perspective view of another embodiment of attachment means for the device.
Figure 8:
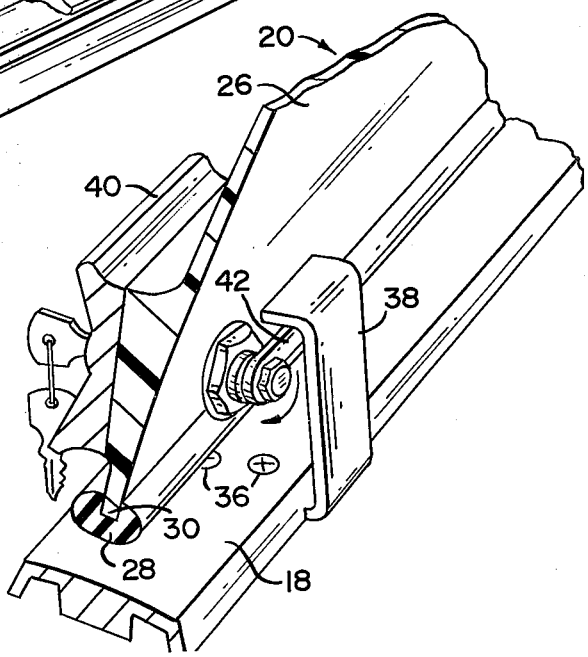
FIG. 8 is a rear view of the embodiment of FIG. 7.

In another embodiment of the present invention, the attachment means comprises a plurality of hinges 24 formed on outermost rub rail 16, as shown in FIGS. 2 and 4, and a plurality of brackets 38 formed on outermost rub rail 18. As best seen in FIG. 8, brackets 38 comprise substantially C-shaped members formed on the inside of rub rails 18. As shown in FIGS. 7 and 8, cover means 20 comprises a plurality of locks 40 attached to one side of cover body 26. Locks 40 further include movable arm members 42 disposed in engaging relationship to brackets 38. A plurality of pins 32 are attached to the other side of cover body 26 in corresponding relation to hinges 24 formed on rub rail 16. As set forth above, both a weather proof and theft proof seal are provided by virtue of the combined action of hinges 24 within pins 32 and arm members 42 with brackets 38.

Still another form of the present invention has been devised whereby articles may be secured to the support means of device 10 without the necessity of using cover 20. As shown in FIG. 6, the structure of the support means of this form includes, in addition to rub rails 12, 16 and 17, a plurality of stanchions 44 attached to automobile top 14 in mating relation to the ends 46 of rub rails 16 and 18. A plurality of cross rails 48 are attached to automobile top 14 in transverse relation to rub rails 12, 16 and 18, each in mating relation to two of stanchions 44. CRoss rails 48 are attached to automobile top 14 by means of fasteners 36. The support means further comprises a plurality of upper support rails 50 matingly attached to the tops of stanchions 44, each of upper support rails 50 extending between two adjacent stanchions 44. The cover means 20 of this form of the invention is configured to completely enclose the support means and to be removably attached and secured in abuting relation to rub rails 16 and 18, cross rails 48 and stanchions 44. It is, of course, intended that the attachment means of this form of the invention may comprise hinges 24 in combination with either lips 22 or brackets 38. In either case, body 26 would include pins 32 and corresponding lock means 34 or locks 40 having arm members 42.

Thus, the structure of the present invention provides a luggage container device of a generally simple, efficient design, which is capable of being manufactured and installed at a reasonable price and which is capable of providing protection of goods placed therein from both weather and theft.

It will thus be seen that the objects made apparent from the preceding description are efficiently attained, and since certain changes may be made in the above construction without departing from the scope of the invention, it is intended that all matter contained in the above description or shown in the accompanying drawings shall be interpreted as illustrative and not in a limiting sense.

It is also to be understood that the following claims are intended to cover all of the generic and specific features of the invention herein described, and all statements of the scope of the invention, which, as a matter of language, might be said to fall therebetween.

Now that the invention has been described, what is claimed is:

1. A roof-top luggage container device of the type designed to be mounted on the top of automobile type vehicles, said device comprising: support means including a plurality of rub rails fixedly attached to the top of the vehicle; cover means removably attached to said support means and including oppositely disposed side wall portions, said plurality of rub rails comprising at least two outer rub rails disposed substantially adjacent the outer periphery of said plurality of rub rails and in engageable relation with the edge of each of said oppositely disposed side wall portions, attachment means including hinge means secured to one of said two outer rub rails, said hinge means movably interconnected to said correspondingly positioned side wall portion, lock means mounted on the other of said oppositely disposed side wall portions and disposed to lockingly engage the other of said two rub rails relative to the rub rail engaging said attachment means, whereby said cover means is removably supported, at least in part, on said two outer rub rails along said oppositely disposed side wall portions of said cover means.

2. A device as in claim 1 wherein said outer two rub rails include a predetermined configuration defined at least in part by the outer peripheral edge thereof formed into a protruding lip means, both said hinge means and said lock means connectable to said lip means on correspondingly positioned of each of said two outer rub rails.

3. A device as in claim 2 wherein said hinge means is fixedly attached to said lip means of one of said outer rub rails, pin means fixedly attached to one of said correspondingly positioned of said side wall portions disposed adjacent said hinge means, said pin means disposed on said one side wall portion in movable engagement with said hinge means.

4. A device as in claim 1 wherein said cover means comprises a body including a sealing gasket mounted on a peripheral edge thereof in abutting relation to said outer two rub rails and to said top, said cover means further comprising a plurality of pins attached to one side of said body in corresponding relation to said attachment means and a plurality of lock means attached to the opposite side of said body in engaging relationship to said attachment means, whereby said cover means may be removably attached and secured to said support means.

5. A device as in claim 1 wherein said two rub rails are the outermost of said plurality of rub rails, said hinge means comprising a plurality of hinges formed on one of said two rub rails and disposed in predetermined relation to one another, said attachment means further comprising a plurality of brackets formed on the other of said two rub rails and disposed in predetermined relation to one another.

6. A device as in claim 1 wherein said support means further comprises a plurality of stanchions attached to said top in mating relation to the ends of said rub rails, a plurality of cross rails attached to said top in transverse relation to said rub rails each in mating relation to two of said plurality of stanchions, and a plurality of upper support rails matingly attached to the top of said stanchions, each of said upper support rails extending between two of said plurality of stanchions.

7. A device as in claim 1 wherein said two rub rails are the outermost of said plurality of rub rails; said attachment means comprising a lip formed on the outside of each of said two rub rails and a plurality of hinges formed on one of said two rub rails, said hinges being disposed in predetermined relation to one another; said cover means comprising a body including a sealing gasket mounted on a peripheral edge thereof in abutting relation to said two rub rails and to the top, said cover means further comprising a plurality of pins attached to one side of said body in corresponding relation to said hinges and a plurality of lock means attached to the opposite side of said body in engaging relationship to said lip, whereby said cover means may be removably attached and secured to said support means in abutting relation to said two rub rails and to the top.

8. A device as in claim 1 wherein said two rub rails are the outermost of said plurality of rub rails; said attachment means comprising a plurality of hinges formed on one of said two rub rails, said hinges being disposed in predetermined relation to one another, said attachment means further comprising a plurality of substantially C-shaped brackets formed on the other of said two rub rails, said brackets being disposed in predetermined relation to one another; said cover means comprising a body including a sealing gasket mounted on a peripheral edge thereof in abutting relation to said two rub rails and to the top, said cover means further comprising a plurality of pins attached to one side of said body in corresponding relation to said hinges and a plurality of lock means attached to the opposite side of said body in engaging relationship to said brackets, whereby said cover means may be removably attached and secured to said support means in abutting relation to said two rub rails and to the top.

9. A device as in claim 1 wherein said two rub rails are the outermost of said plurality of rub rails; and wherein said support means further comprises a plurality of stanchions attached to said top in mating relation to the ends of said rub rails, a plurality of cross rails attached to the top in transverse relation to said rub rails each in mating relation to two of said plurality of stanchions, and a plurality of upper support rails matingly attached to the top of said stanchions, each of said upper support rails extending between two of said plurality of stanchions; said attachment means comprising a lip formed on the outside of said two rub rails and a plurality of hinges formed on one of said two rub rails, said hinges being disposed in predetermined relation to one another; said cover means comprising a body including a sealing gasket mounted on a peripheral edge thereof in abutting relation to said support means, said cover means further comprising a plurality of pins attached to one side of said body in corresponding relation to said hinges and a plurality of lock means attached to the opposite side of said body in engaging relationship to said lip, whereby said cover means may be removably attached and secured to said support means.

10. A device as in claim 1 wherein said two rub rails are the outermost of said plurality of rub rails; and wherein said support means further comprises a plurality of stanchions attached to said top in mating relation to the ends of said rub rails, a plurality of cross rails attached to the top in transverse relation to said rub rails in mating relation to two of said plurality of stanchions, and a plurality of upper support rails matingly attached to the top of said stanchions, each of said upper support rails extending between two of said plurality of stanchions; said attachment means comprising a plurality of hinges formed on one of said two rub rails, said hinges being disposed in predetermined relation to one another, said attachment means further comprising a plurality of substantially C-shaped brackets formed on the other of said two rub rails, said brackets being disposed in predetermined relation to one another said cover means comprising a body including a sealing gasket mounted on a peripheral edge thereof in abutting relation to said support means, said cover means further comprising a plurality of pins attached to one side of said body in corresponding relation to said hinges and a plurality of lock means attached to the opposite side of said body in engaging relationship to said brackets, whereby said cover means may be removably attached and secured to said support means.

* * * * *